Sept. 1, 1942.   J. P. THOMSON   2,294,585
PHOTOGRAPHIC ENLARGER OR PROJECTION PRINTER
Filed Aug. 13, 1940   8 Sheets-Sheet 1

INVENTOR.
John P. Thomson

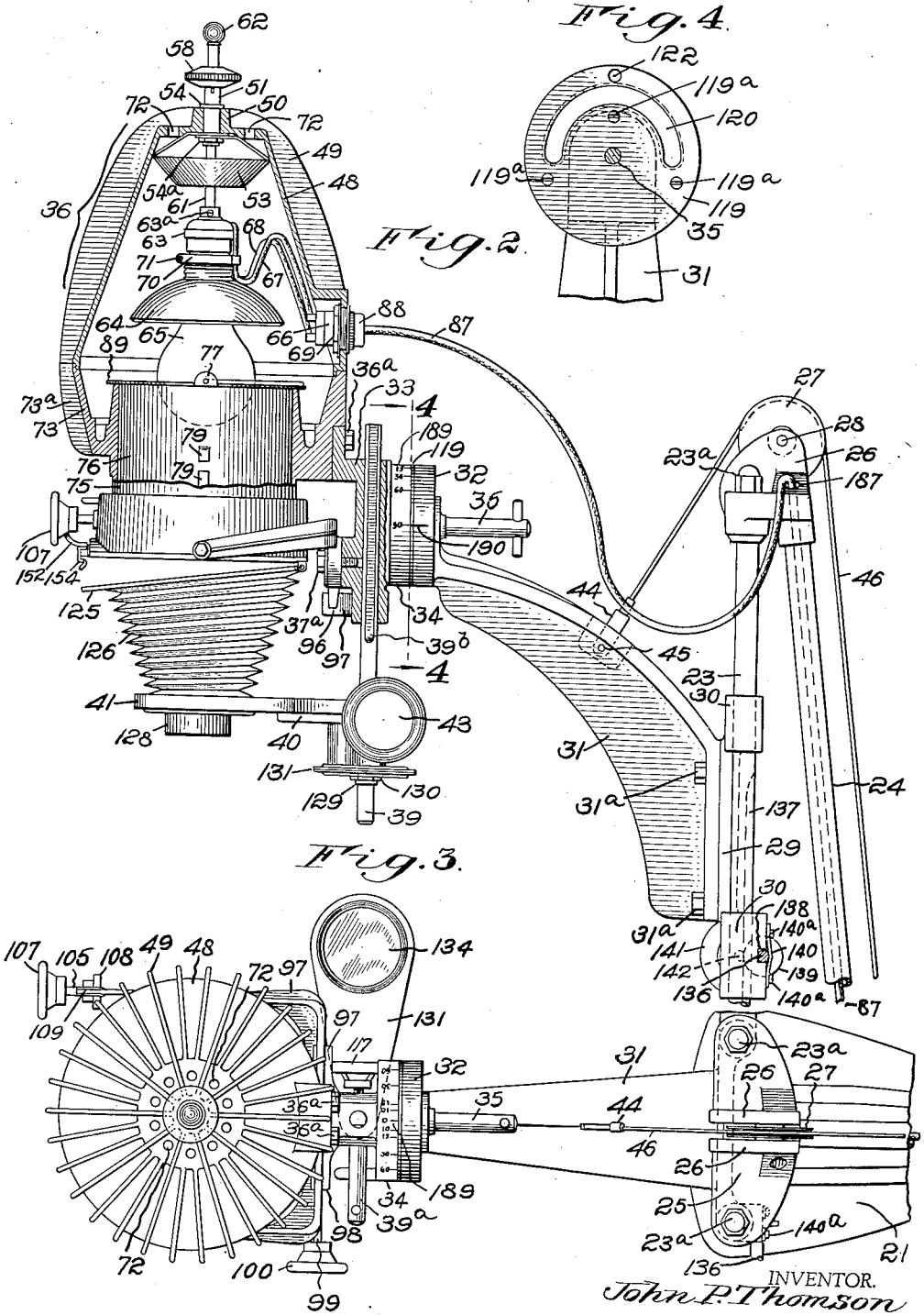

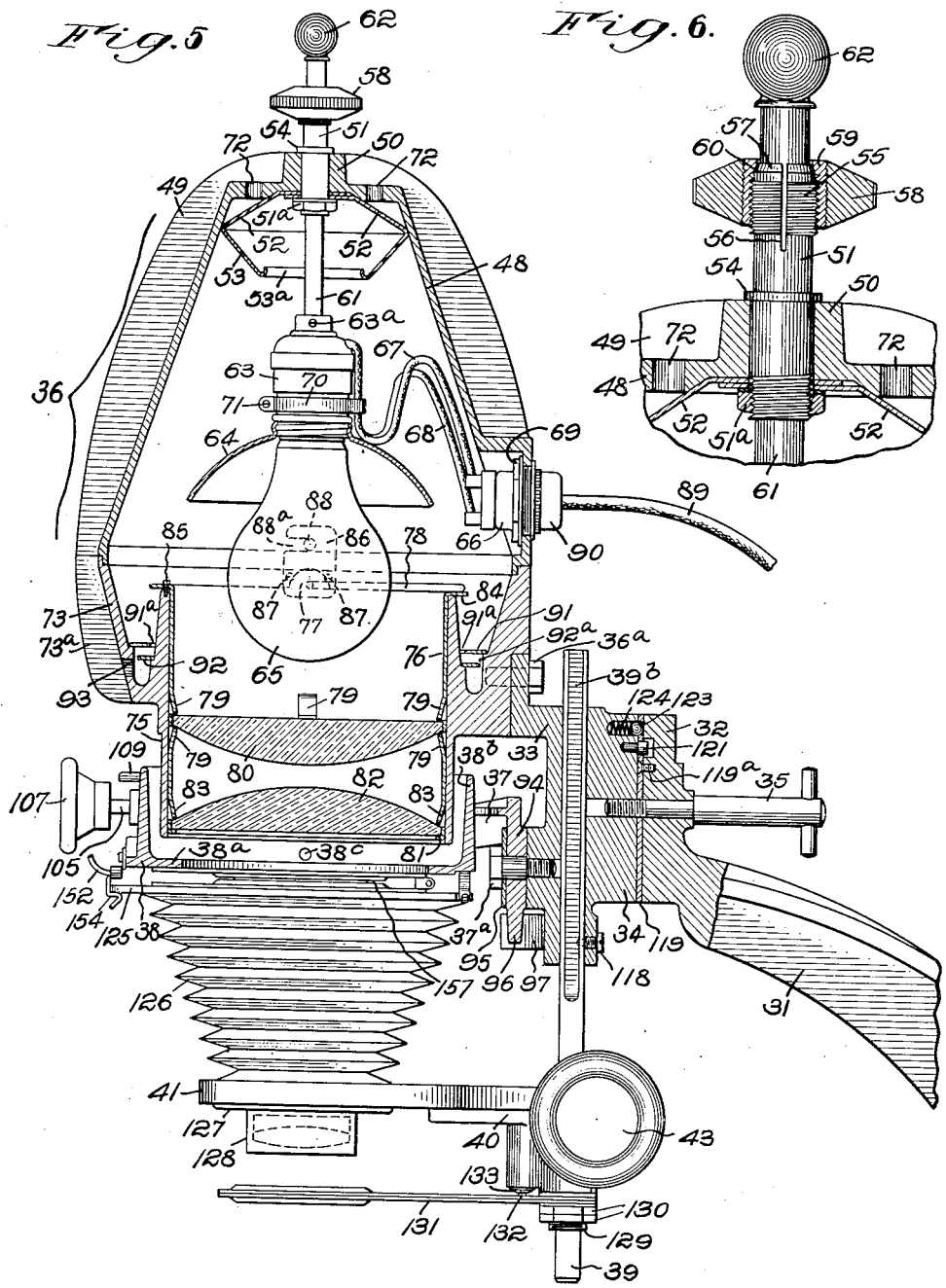
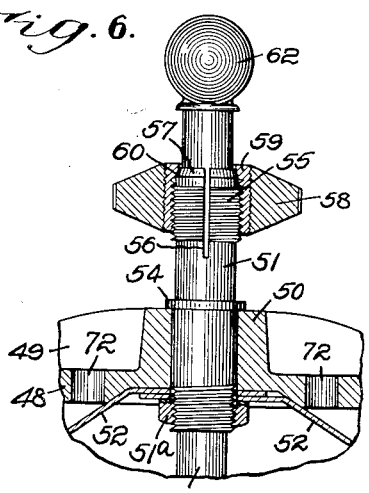

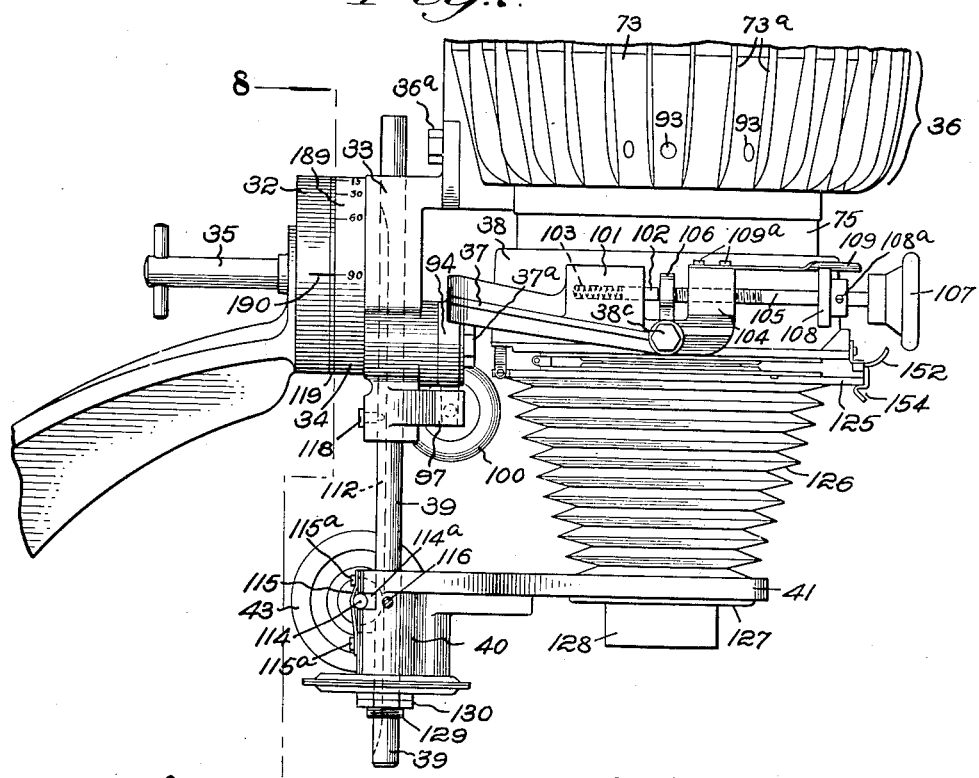

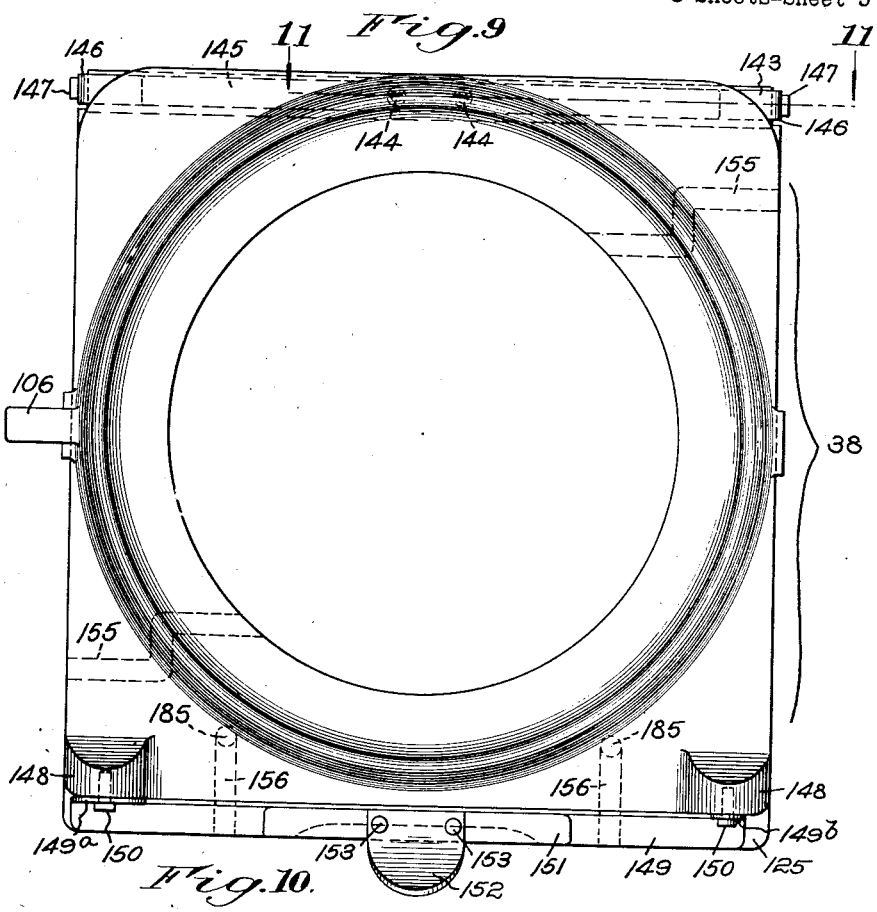
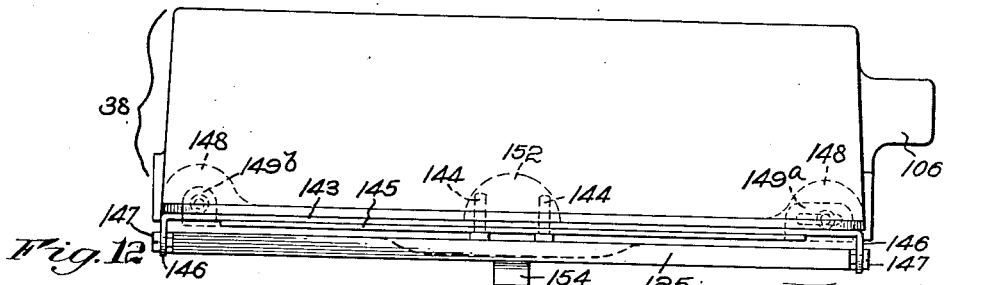
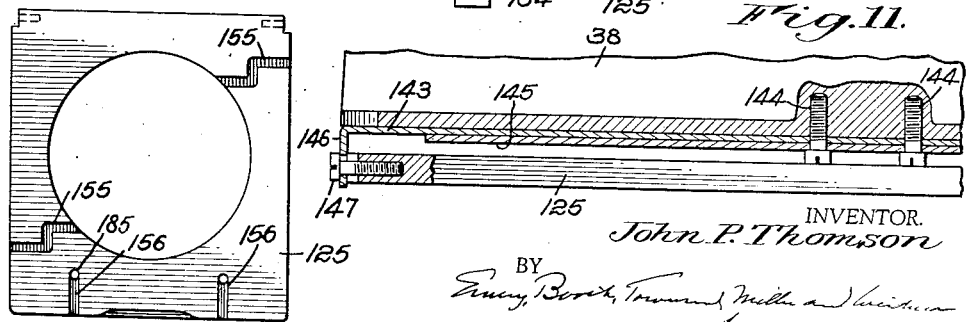

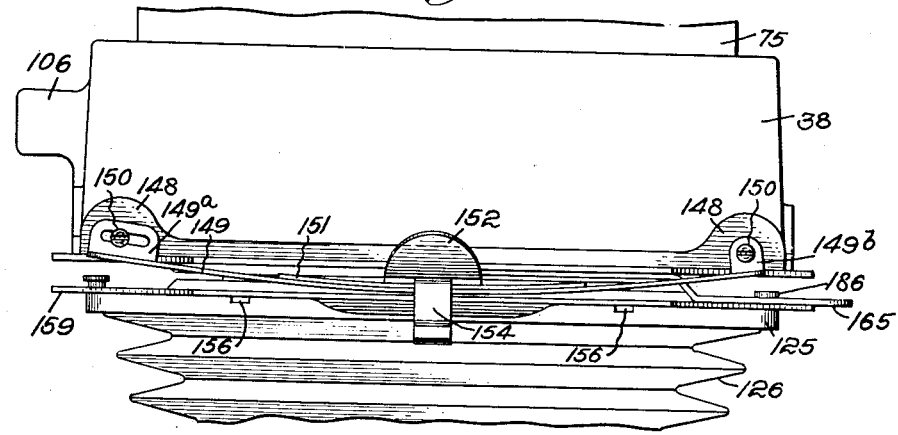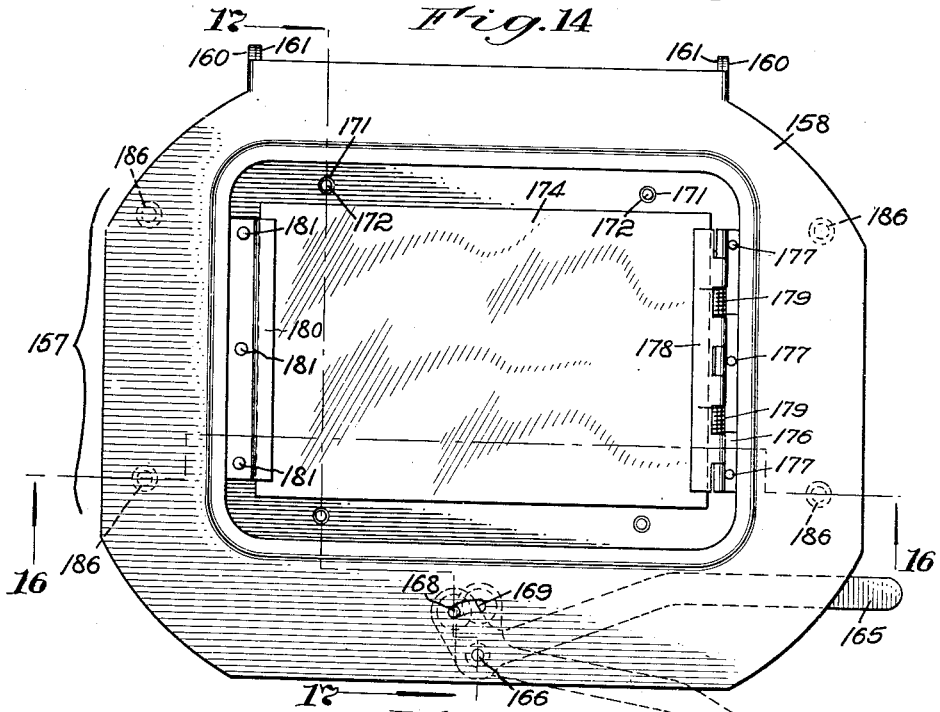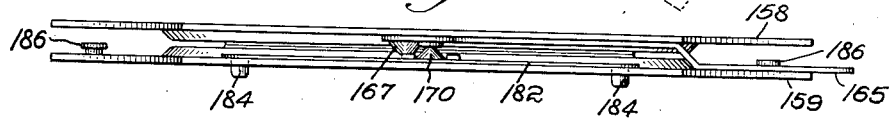

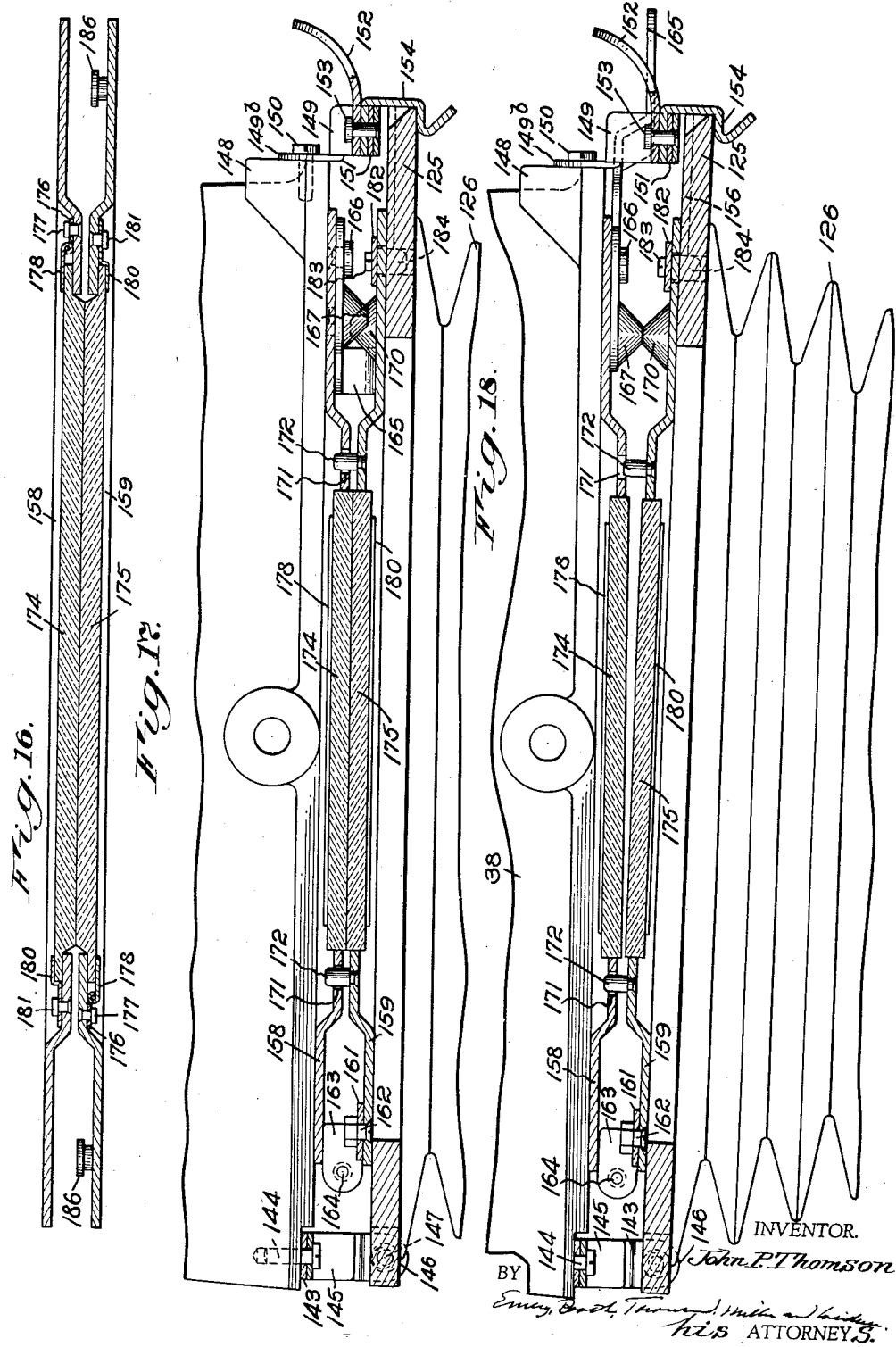

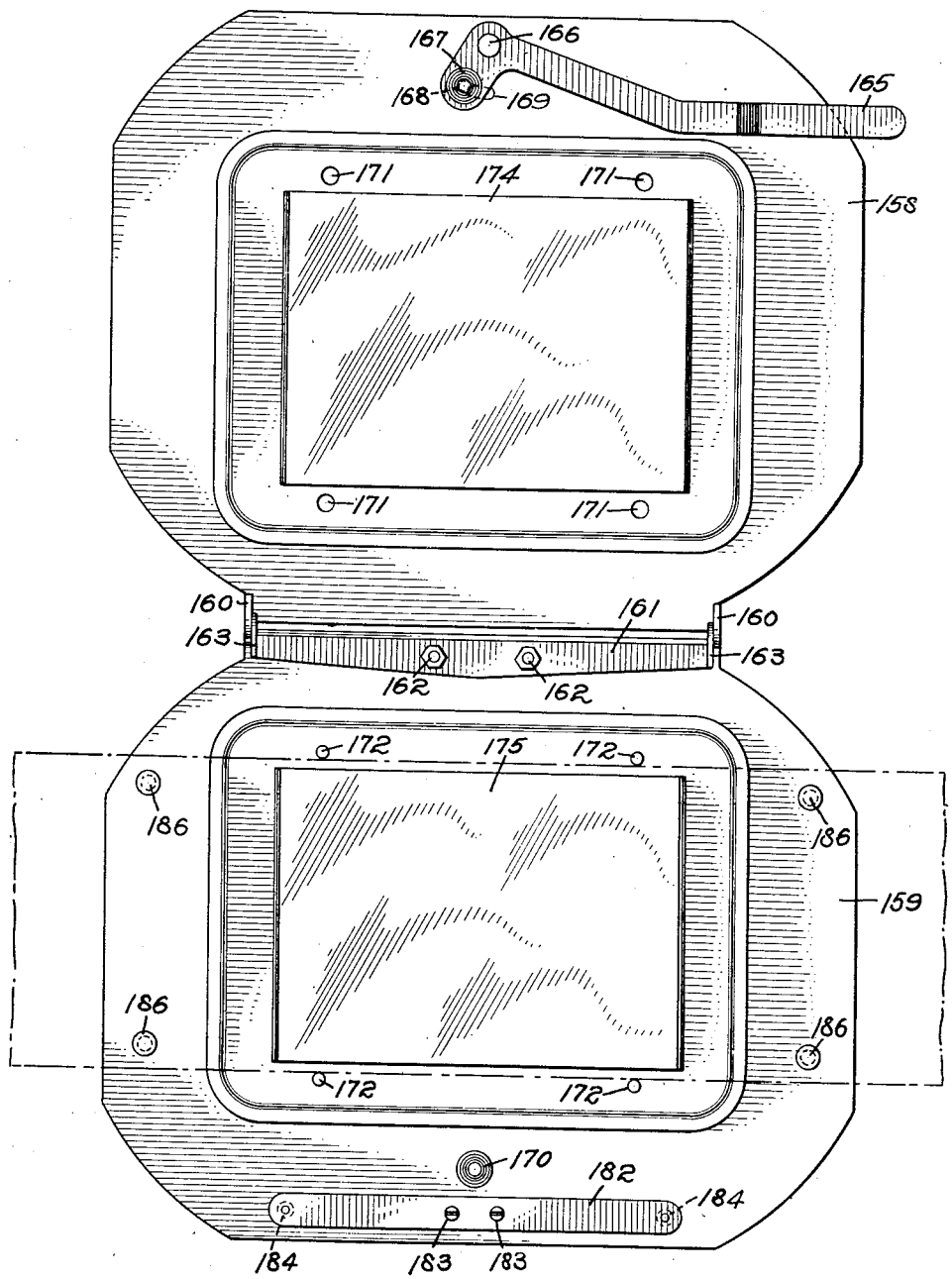

Patented Sept. 1, 1942

2,294,585

UNITED STATES PATENT OFFICE 2,294,585

PHOTOGRAPHIC ENLARGER OR PROJECTION PRINTER

John P. Thomson, Rochester, N. Y., assignor to The Folmer Graflex Corporation, Rochester, N. Y., a corporation of Delaware Application August 13, 1940, Serial No. 352,377

34 Claims. (Cl. 88—24)

This invention relates to photographic enlargers or projection printers. In order that the principle of the invention may be readily understood, I have disclosed a single embodiment thereof in the accompanying drawings, wherein—

Fig. 2 is a side elevation of the projector head and adjacent parts, but partly in section to show the structure of the lamp house;

Fig. 3 is a top plan view of the enlarger, the head being in position for vertical operation;

Fig. 4 is a detail of the projector head support arm viewed from the section line 4—4 of Fig. 2, the head having been removed from the support arm;

Fig. 5 is an enlarged vertical sectional view similar to Fig. 2 of the lamp house and the condenser mounting container;

Fig. 6 is a fragmentary, vertical section through the top of the lamp house, showing the means for adjusting the lamp in a vertical direction;

Fig. 7 is a side elevation of the projector head with part of the lamp house broken away, showing the adjustment for longitudinal swing;

Fig. 8 is a rear, elevational view of the construction shown in Fig. 7, from the line 8—8 thereof;

Fig. 9 is a top plan view of the upper platen;

Fig. 10 is a detail showing in side elevation the upper and lower platens in closed condition;

Fig. 11 is a fragmentary, transverse, vertical section of Fig. 9 on the line 11—11 thereof;

Fig. 12 is a top plan view of the lower platen showing the air vents;

Fig. 13 is a partial front elevation of the negative carrier in place between the upper and lower platens;

Fig. 14 is a top plan view of the negative carrier;

Fig. 15 is an end view showing the negative carrier of Fig. 14 in closed condition;

Fig. 16 is a vertical transverse section on the line 16—16 of Fig. 16, the negative carrier being in closed condition;

Fig. 17 is a vertical transverse section on the line 17—17 of Fig. 14, the platens and negative carrier being in closed condition;

Fig. 18 is a vertical transverse section similar to Fig. 17, the negative carrier being in open condition; and Fig. 19 is a plan view of the negative carrier when fully opened, to show more clearly the construction thereof.

Figure 1:
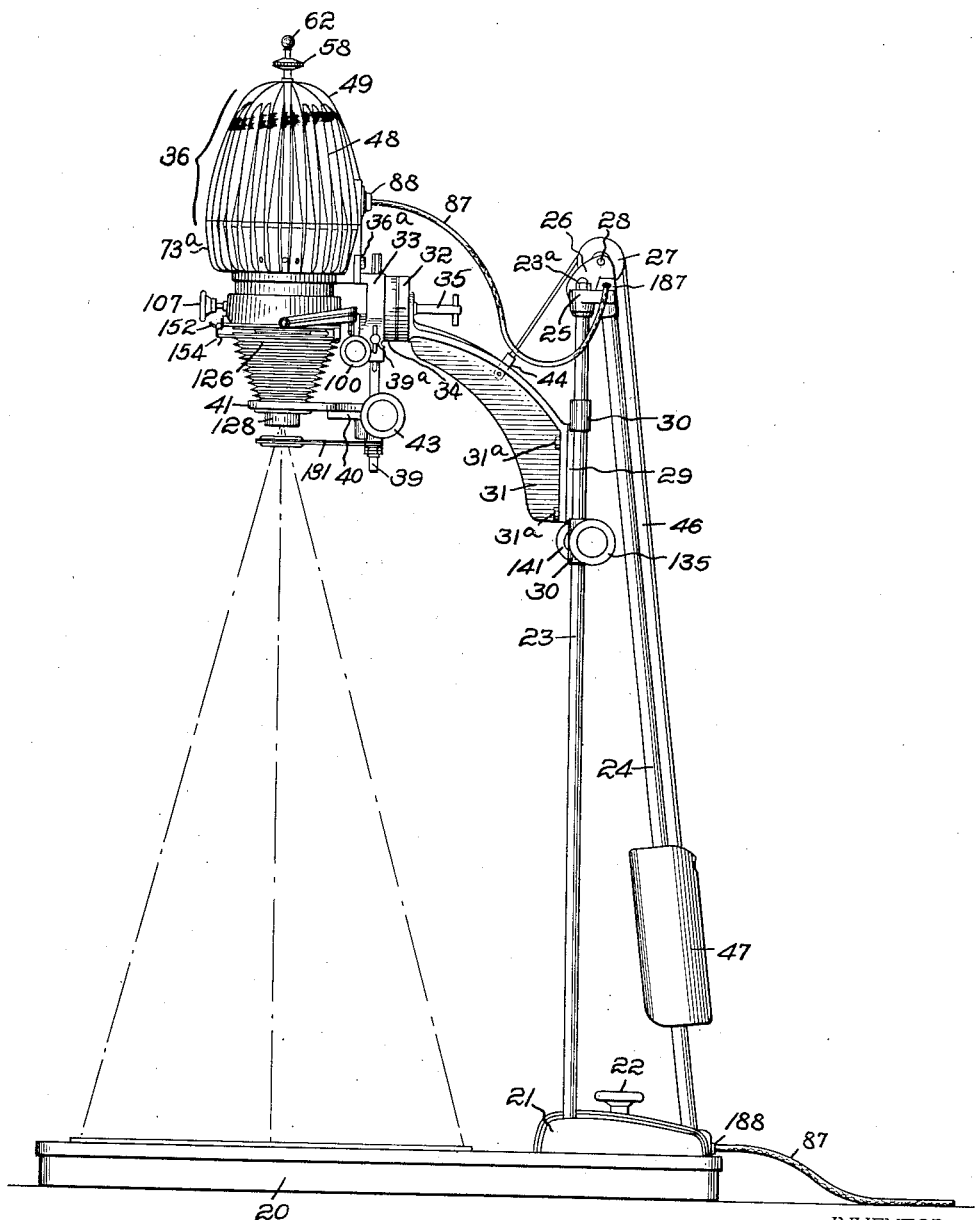
Fig. 1 is a side elevation of the enlarger or projection printer, the projector head having been moved to a position near the upper limit of its vertical travel.

The construction herein disclosed and claimed is an improvement upon the invention shown in the co-pending application of Skinner & Willcox, Ser. No. 306,042, filed November 25, 1939, now Patent No. 2,236,303, dated March 25, 1941.

Important objects of the present invention are to provide an enlarger or projection printer having the greatest latitude of adjustments; one that is easy to manipulate and having means for blocking all adjustments so that once the enlarger is adjusted to a particular condition, such adjustment will be maintained; one in which the light condenser or lens system is a self-contained unit which can be readily removed from and replaced in the lamp house, the latter having the greatest possible amount of ventilation but with light-leak reduced to an absolute minimum, the lamp house and condenser system being readily removable from the rest of the structure; the enlarger or projection printer having a negative carrier provided with means for maintaining a positive pressure on the negative, and the platen structure being such that it can readily be opened for the insertion of the negative carrier, the structure being provided with equalizing means that automatically adjusts itself to negative carriers of various thicknesses.

Referring first and more particularly to Figs. 1, 2 and 3, the main base of the enlarger or projection printer is indicated at 20, the tripod subsidiary-support base at 21 and the tripod base clamping knob at 22, the latter being provided with a center bolt passing down through the base casting 21 and anchored in the main base 20. The tripod vertical supports or rods are indicated at 23, but one of them being shown in Fig. 1, the two of them being, however, indicated in Fig. 3. The tripod, inclined, brace rod is indicated at 24 and is made as a tubular piece. The tripod head is indicated at 25, it being secured to the two vertical rods 23 by means of nuts 23a, 23a, best shown in Fig. 3. The said brace rod 24 is threaded into the tripod head 25. The two rods 23 and the tubular rod 24 are fitted into suitable holes in the subsidiary base 21 and are held therein by means of clamping nuts (not shown). Integral with the said head 25 are bearing members 26, 26 slightly spaced apart as shown in Fig. 3, and which support a counterweight pulley 27 riding on a pin or rivet 28 that passes through bearing members 26 and through a hole in the pulley 27.

Sliding on the vertical rods 23 is a bracket support spider 29 provided with spaced bosses 30, 30 having suitable holes for receiving said rods. The said spider 29 has attached thereto a bracket or arm 31 by means of screws 31a, 31a or by any other suitable means such as rivets. The said bracket or arm 31 constituting the support for the enlarger or projection printer structure, is provided with an enlarged end or pad 32 of general cylindrical or disk shape, to which is attached the enlarger or projector support member 33 having a similar pad or boss 34 of cylindrical or disk shape. The said support member 33 is held to the bracket or arm 31 by means of a thumb screw 35 threaded into the pad or boss 34.

To the projector support member 33 is attached the lamp house which is indicated generally at 36, and which is attached to the said support member 33 by screws 36a, 36a. Also attached to the support member 33 is a platen support member 37, shown most clearly in Figs. 1, 5 and 7. The said platen support member 37 is of general U-shape and is held to the support member 33 by a shoulder screw 37a, best shown in Figs. 2 and 5. The platen support member 37 supports an upper platen 38, shown in Figs. 2, 5, and in detail in other figures, which is made up of a horizontally positioned flat plate 38a and an upwardly extending cylindrical collar 38b attached to said plate by shoulder screws 38c, 38c. The support member 33 is provided with a vertical hole into which is fitted an upright shaft 39, shown in Figs. 1, 2, 5 and 8. The said shaft 39 can be adjusted in a vertical direction and then be locked in place by means of a thumb screw 39a, shown in Figs. 1 and 3.

Movable in a vertical direction upon the said upright shaft 39 is a lower bellows support member 40 having attached thereto a bellows plate 41. The said member 40, shown as a bracket, is movable in a vertical direction along the shaft 39 by means of an adjusting knob 43 and cooperating parts to be subsequently described. To the said supporting bracket or arm 31 is attached a cable clevis 44, shown in Figs. 1 and 2, by means of a pin 45. Attached to the said clevis 44 is a cable 46 that passes over the pulley 27 as shown in Figs. 1 and 2 and is connected to a counter-weight 47. The structure just described is for the purpose of counterbalancing the projector head as it is moved vertically along the upright rods 23. The said counterweight 47 is provided with a hole through which passes the tripod brace rod 24, which thus provides a fixed path for the travel of the said counterweight 47.

Referring particularly to Figs. 1, 2, 5 and 6, the lamp house 36 is there shown as made up of two truncated conical or tapering sections or cones, the upper one of which is indicated at 48 and is provided with a number of spaced vertical radiating fins 49 extending the entire length thereof. At the upper end of the section or cone 48 is provided an upright boss 50 through which passes a bushing 51, as shown in Fig. 6, and having its lower end threaded. Over the lower end of the bushing 51 are placed two relatively narrow arms 52, 52 permitting the passage of air between them and which support a light-baffling complete cone 53, shown in its entirety in Fig. 5. The said light-baffling cone 53 is held in place by means of a nut 51a threaded onto the sleeve 51 and prevented from passing through the boss 50 by a shoulder 54. The upper end of the sleeve 51 (as shown in Fig. 6) is provided with a threaded end or bushing 55 and with opposite slots 56, 56, one of which is there shown. The upper end of the said sleeve 51 is provided with a tapered face 57. Over the said threaded end 55 is fitted a nut 58 having a metal sleeve or bushing 59 provided with a taper 60 to fit the tapered end 57 of the sleeve 51. When the nut 58 is turned in a clockwise direction, the threaded end 55 is caused to contract, thus clamping onto the lamp house support rod or tube 61.

The nut 58 is preferably made of a plastic or other non-heat conducting material so that adjustment of the rod or tube 61 can be made even though the upper section or cone 48 of the lamp house is quite warm. To the upper end of the said rod or tube 61 is suitably attached a knob 62 also preferably made of material that is a poor heat conductor, so that said rod or tube 61 can be moved when the nut 58 is turned in a contra-clockwise direction, to allow the bushing or end 55 to expand and permitting said rod or tube 61 to slide freely in a vertical direction, whereupon the nut 58 is turned in a clockwise direction, thereby clamping the rod or tube 61 in the desired position.

To the lower end of the said rod or tube 61 is attached a conventional lamp socket 63 locked thereto by a screw 63a. Threaded to the lamp socket 63 is a reflector 64, and threaded into the lamp socket is a lamp bulb 65. The said lamp socket is electrically connected to a suitable connecting member 66 by wires 67, 68. The said member 66 is fitted into a hole in the side of the upper cone or section 48 of the lamp house and is held therein by means of a nut 69. The structure of the said member 66 may be conventional and requires no further description. The wires 67, 68 are of sufficient length to permit adjustment of the lamp bulb 65 in a vertical direction within the limits of the rod or tube 61. The said wires 67, 68 are anchored to the lamp socket 63 by means of a clamp 70 held thereto by a screw 71. In the upper wall of the upper cone or section 48 of the lamp house is provided a series of holes 72, 72 permitting free passage of air out of the top of the said conical member of the lamp house. In Fig. 3, the number of holes 72 is shown as ten, but it may be varied within the scope of the invention.

The lower cone or section of the lamp house 36 is indicated at 73, as best appearing in Figs. 2 and 5. It is provided with a corresponding series of vertical radiating fins 73a, best shown in Figs. 2, 5 and 7, which align longitudinally with the radiating fins 49, 49 of the upper cone section 48. The said lower cone or section 73 has, as best shown in Figs. 2 and 5, an upwardly extending cylindrical tube 74, and a downwardly extending cylindrical tube 75, both of which may be integral therewith and desirably in alignment. In the said tubes 74, 75 is mounted a cylindrical shell 76, shown in Fig. 5, which has ears 77 receiving a shell bail 78 shown in horizontal position in Fig. 2. The said bail is provided to afford means for the ready removal of the condenser or lens system contained within the said shell 76.

The construction of the said shell 76 is most clearly indicated in Fig. 5, and as therein shown it has a series of extruded projections 79, 79 suitably spaced both circumferentially and vertically to receive the periphery of and thereby support an upper condenser or lens 80. The lower end of the said shell 76 is provided with an inwardly extending peripheral lip or rim 81 to support a lower condenser or lens 82 which is likewise held in position by a series of circumferentially spaced extruded projections 83, 83. The upper end of the shell 76 is provided with a turned-over annular lip or rim 84. Through a hole in the said rim 84 passes a screw 85 that is threaded into the upper end of the said cylinder 74 so as to hold the condenser shell assembly in position.

It will be evident that the shell 76 with its bail 78 has the form of a bottomless pail or lining in which are supported in spaced relation the two condensers or lenses 80, 82.

This manner of mounting the condensers or lenses 80, 82 renders it very convenient to remove them from the lamp house 36 for cleaning purposes or for the substitution of condensers or lenses of a different focal length. It is necessary to change condensers or lenses and the position vertically of the light source, such as the lamp bulb 65, when the objective lens of a projection printer is changed. If, for example, a four inch projection lens be used, a set of condensers or lenses 80, 82 of a suitable focal length must be used therewith and the lamp 65 must be adjusted to the correct position with respect to the condenser or lenses that are so used. If, however, it is desired to use a projection lens of a two inch focal length, a different set of condensers or condensing lenses would then be necessary to operate at the greatest efficiency, and at the same time the position of the lamp 65 must be adjusted vertically to a position nearer the condensers or lenses 80, 82, or to a position for obtaining a satisfactory illumination over the negative areas. Moreover, there are times when for certain types of work light condensers are desirably not used. In such case the condensers or lenses herein disclosed may be very readily removed from the lamp house assembly.

In order to make the upper cone or section 48 of the lamp house readily detachable from the lower cone or section 73 thereof, I have provided a latch plate 86, best shown in Fig. 5, which is attached to the cone or section 73 by rivets 87. Secured to the upper cone or section 48 is a pin 88 in proximity to the said latch plate. By rotating the upper cone or section 48 of the lamp house through a short distance in a contraclockwise direction, the pin 88 will be disengaged from the notch 88a of the latch plate 86, thus permitting the upper cone or section 48 of the lamp house to be removed from the lower cone or section 73 thereof.

When removing the lamp house wholly from its supporting means, it is desirable to disconnect any electrical cords or any appliances that are necessary to supply the lamp such as 65 with electrical energy. Therefore, I have fitted to a cord 89 a plug 90 readily detachable from the connecting member 66. The said plug 90 is of well known standard construction and therefore does not need further description.

There are times when the entire lamp house 36 including the condenser or lens system thereof must be removed from the lower part of the projection head. I have provided for this contingency by the construction hereinbefore described. The separation of the parts is effected by removing the screws 36a, 36a and by detaching the plug 90 from the connecting member 66. This leaves the platen support and the bellows (yet to be described) and the lens support in such position that they can be used for other purposes, such as in a copying camera, this being accomplished by the attachment of suitable devices for holding the negative material, and which other uses it is not necessary herein to disclose in detail. It is sufficient to state that the entire lamp house 36 can readily be removed from the rest of the structure for the purpose referred to or for any other purpose.

The lower cone or section 73 of the lamp house 36 is provided with a baffle ring 91 fitting into the said cone, as best illustrated in Fig. 5 and in such a manner that an air space is provided around the inner edge of the ring 91 and the tube 74, as indicated at 91a. To the said tube 74 is fitted a second ring 92 slightly below and spaced from and parallel with the ring 91, in such a manner that an air space 92a is provided around its outer edge inside the inner face of the lower cone or section 73 of the lamp house. In said lower cone or section 73, there is also provided a series of circumferentially arranged ventilating holes 93, one of which is shown in section in Fig. 5 and additional ones of which are represented in Fig. 1. Such holes are provided between each two adjacent fins or between such of them as desired. The said holes 93 are provided for the circulation of air through the lamp house 36.

The air entering through the holes 93 passes around the outer edge of the baffle ring 92, then around the inner edge of the baffle ring 91 and up along the inner walls of the upper cone or section 48 of the lamp house 36. The circulating air will be deflected inwardly near the upper end of the upper cone or section 48 of the baffle cone 53 so as to pass through the opening 53a of the baffle 53 and so past the narrow arms 52 and out through the holes 72, 72 in the top of the upper cone or section. Air will also be caused to move upwardly around and along the outside of the entire lamp house 36 and will absorb heat from the radiation fins 49, 49 and 73a, 73a. This assures adequate ventilation and cooling at all times. Inasmuch as there is no direct connection between the cylindrical extension or tube 75 of the lower cone or section of the lamp house and any surrounding part or parts therebelow, there will be no heat directly conducted to the negative carrier.

It has already been stated that the platen support or bracket 37 is connected to the projector support 33 by means of the shoulder screw 37a. A more detailed description of the immediately cooperating parts of the structure therewith will now be given, making special reference to Figs. 2, 5, 6 and 8.

The said platen support member 37 is provided with a pad or portion 94 having a hole through which passes the shoulder screw 37a, previously referred to, and under the head of such shoulder screw is a washer 95. The shoulder on the screw 37a is of such length that when the screw is fully tightened, there will be just sufficient play to allow the platen support member 37 to be rotated about the said shoulder screw 37a. The pad or portion 94 is also provided with a downwardly extending lug 96 and the projector support member 33 is provided with an adjacent boss or lug 97 into which is fitted a spring-loaded plunger (not shown) engaging the lug 96 so as to cause the platen support member 37 to be rotated in a clockwise direction viewing Fig. 8.

The said projector support member 33 has a boss 98, best shown in Figs. 3 and 8, and which extends to the left of the center of the projector when viewing Fig. 8. Carried by the said boss 98 is a threaded horizontally arranged shaft 99 having a knob 100, best shown in Figs. 3 and 8.

The shaft 99 is threaded into a projection in the said boss 98 and makes contact with the lug 96. Inasmuch as said lug 96 will be caused at all times to make contact with the end of the threaded shaft 99, any rotary motion of the knob 100 will cause the platen support member 37 to be rotated about the shoulder screw 37a. When the knob 100 is turned in a clockwise direction, the platen support member 37 will be caused to rotate in a contraclockwise direction viewing Fig. 8, thus compressing the spring of the spring-loaded plunger previously referred to. If the knob 100 is turned in a contraclockwise direction, the said spring-loaded plunger, co-acting with the lug 96, will cause the platen support member 37 to be rotated in a clockwise direction viewing Fig. 8. This construction is provided for the purpose of obtaining a sidewise tilt with respect to the axis of the projector head, to correct for perspective or distortion in one direction.

As best shown in Fig. 7, the platen support member 37 is provided with a boss 101 having seated in a socket therein a plunger 102 thrust forward by a suitable coiled spring 103 in said socket. The outer end of the platen support member 37 is provided with a second boss 104 also best shown in Fig. 7. Threaded in the boss 104 is a threaded rod 105 horizontally arranged and contacting with a boss 106 extending outward from the upper platen 38. The said threaded rod 105 has a knob 107 and a notched collar 108 held to the rod 105 by a locking screw 108a. Attached to the boss 104 is a spring finger 109 secured by screws 109a. The purpose of the spring finger 109 is to engage the notch in the collar 108 when the knob 107 is in a position wherein the upper platen 38 is horizontal. Inasmuch as the upper platen 38 is pivoted upon the screws 38c, 38c (Fig. 7) through a third hole in the platen support member 37, any turning movement of knob 107 will cause said upper platen 38 to be rocked either in a clockwise or contraclockwise direction. When the knob 107 is turned in a clockwise direction, said upper platen 38 is turned in a contraclockwise direction viewing Fig. 7, thus causing the plunger 102 to be forced inward into its socket in the boss 101, thereby compressing the spring 103. When the knob 107 is turned in a contraclockwise direction, the said upper platen 38 will be moved in a clockwise direction under the influence of said plunger 102 and spring 103. There is thus provided a rocking motion in a direction ninety degrees opposed to the motion previously referred to, and in this manner the said upper platen may be tilted in any direction to compensate for distortion in the negative or in order to create distortion.

The shaft 99 is provided with a notched collar 110, best shown in Fig. 8, which is exactly the same in construction as the notched collar 108, it being held to said shaft 99 by a locking screw 110a. A locking finger 111 is also provided for engaging and locking the notched collar 110. This latter structure, while not shown in entire detail, is similar to or the same as the structure constituting the rocking means shown in Fig. 7.

Still referring to Figs. 7 and 8, the shaft 39 is provided with a keyway 112, and riding in said keyway is a conical disk 113, shown in Fig. 8, which is connected to a transversely extending shaft 114 and to knob 43. The said shaft 114 is held in the notch 114a (Fig. 7) of the bellows support bracket 40 by means of two springs 115, 115, shown in side elevation in Fig. 7 and in plan in Fig. 8. The said springs are held to the bellows support bracket 40 by means of screws 115a. Any turning motion of knob 43 will be transmitted to the conical disk 113 riding in the keyway 112, thus causing the bellows support bracket 40 to be moved in a downward direction along the shaft 39.

Threaded into the bellows support 40 is a threaded rod 116, shown in Figs. 7 and 8, provided with a knob 117. The threaded hole in the bellows support bracket 40 is in alignment with the shaft 39, as clearly shown in Fig. 7. When the knob 117 is turned in a clockwise direction viewing Fig. 8, the threaded rod 116 is caused to contact with the shaft 39, thus locking the bellows support bracket 40 in position. Riding in the said keyway 112 of the shaft 39 is a pointed screw 118, best shown in Fig. 7. The purpose of this is to prevent the shaft 39 from turning and at the same time to limit the movement of said shaft 39 in either an upward or downward direction when the shaft 39 is being adjusted.

Viewing particularly Figs. 1, 2 and 5, everything to the left of the enlarger or projector support member 33, including such member and its pad 34, constitute the entire projector head, and the tripod structure with its support spider 29 slidable thereon and the bracket or arm 31 together constitute upright main supporting means or supporting means for the lamp house.

The projector support member 33 has been described as attached to the arm 31 by means of the shoulder screw 35. At times it is desirable to swing the projector head about the axis of the said screw 35 to correct for distortion in negatives or to project on the wall, if necessary. Therefore, there is provided means for swinging the projector head ninety degrees on either side of the central position, and to that end, as most clearly shown in Fig. 4, there is provided a plate 119 for supporting the arm 31. The said plate 119 is attached to a support-boss 32 of said arm 31 by means of flat-head screws 119a, 119a, and said plate 119 is provided with a segmental slot or groove 120 in which rides a dowel 121, as shown in Fig. 5, where the plate 119 appears in section. The said plate 119 also has a small hole 122 on the center axis of the arm 31, as clearly appears in Fig. 4, and which is engaged by a ball 123, shown in Fig. 5, that is caused to be moved forward by a coil spring 104 received in a suitable socket in the pad 34. The purpose of the ball 123, which constitutes a detent, is to align the projector head in a vertical position, but it requires only a small amount of effort on the part of the operator to swing the projector head to either side of the center, the clamping shoulder screw 35 being first loosened. When the desired position of the projector head is secured, the said clamping screw 35 is turned in a clockwise direction, thereby clamping the pad or boss 34 to the boss 32, thus locking the projector head in the desired position.

To the upper platen 38, as best shown in Figs. 2, 5 and 7, is attached the lower hinged platen 125, the mounting whereof will be subsequently described. To said lower platen 125 and to the bellows plate 41 is attached the bellows 126 fastened to said lower platen and to said bellows plate in any suitable manner. Said bellows plate 41 is provided with a recess (not shown) to receive a lens board 127 carrying a projection lens 128. The bellows support member 40 is provided with a threaded cylindrical extension 129, indicated in Fig. 7, receiving nuts 130, 130, and over said cylindrical extension is mounted a filter bracket 131, best shown in Fig. 8. The said filter bracket is provided with an extruded cone-shaped point 132 engaged by a detent 133, shown in Fig. 5. The said detent has a spring (not shown) causing it to engage the point 132 when the filter bracket is in such position as to hold the filter 134 in alignment below the projection lens 128. The filter may be swung in front of the projection lens for the purpose of focusing, and before the actual exposure is made, the filter is swung to one side so as to clear the light beam passing through the projection lens.

The projection head itself is movable in a vertical direction along the vertical supports or rods 23, 23 by means of a hand wheel 135, shown in Fig. 1, which is provided with a shaft 136, indicated in Figs. 2 and 3. The right hand vertical support 23, viewing Fig. 3, is provided with a keyway 137, shown in dotted lines in Fig. 2, and the lower boss 30 is provided with a notch 138, shown in Fig. 2, to receive the shaft 136. Attached to the shaft 136 is an oppositely conical wheel 139, indicated in Fig. 2, which, being provided with opposite tapered sides, fits the tapered keyway 137 in the said right hand vertical support or rod 23. The said shaft 136 is held to the said lower boss 30 by means of flat springs 140, 140, themselves held to the said boss 30 by means of screws 140a, 140a.

Any rotative movement of the hand wheel 135 will be transmitted to the said conical wheel 139 and to the said shaft 136. Inasmuch as said conical wheel is held in the keyway 137, which itself has tapered walls, both bosses 30 and the bracket support spider 29 will be moved lengthwise along said vertical support or rod 23. When said hand wheel 135 is turned in a clockwise direction, the spider 29 will be caused to travel in an upward direction on said support or rod 23. In order to clamp the said spider 29 securely in place when the selected position has been arrived at, there is provided clamping means of any suitable character, but preferably comprising a clamping knob 141, indicated in Fig. 2, and having a threaded shaft 142, indicated in dotted lines.

I will next describe the details of the lower platen, and then the negative holder, shown in Figs. 9 to 19 inclusive.

Referring particularly to Figs. 9 to 12, the upper platen 38 is indicated in plan in Fig. 9, as removed from the enlarger or printer in order more clearly to show the construction of the related parts. As already stated, said upper platen 38 has hinged thereto the lower platen 125, which is shown in plan in Fig. 12. To one edge or end of said upper platen 38 is attached a flat spring 143, shown in section in Fig. 11, which is held in place by screws 144, 144, shown in full lines in Fig. 11 as threaded into the upper platen 38 but passing through holes in said spring 143, which latter is provided with a reinforcing spring 145 laid flatwise thereagainst, as shown in Fig. 11. The spring 143 is provided with opposite downturned ends 146, 146 having clearance holes or pivot screws 147 threaded into one end of said lower hinged platen 125.

The opposite edge or end of the upper platen 38 is provided with two upstanding bosses 148, 148 to which is fastened a front latching spring 149, shown also in Fig. 13, and having upturned lugs 149a, 149b, indicated in dotted lines in Fig. 10, and held to the said bosses 148, 148 by means of screws 150, 150, passing through openings in said lugs 149a, 149b. The said spring 149 is also provided with a reinforcing spring 150 secured flatwise thereagainst, it, together with a handle 152 (as shown in the sectional views Figs. 17 and 18), being riveted to the spring 149 by rivets 153, 153. Also, as most clearly shown in Figs. 13, 17 and 18, there is a latching member 154 to engage the handle 152.

The lower hinged platen 125 can be separated from the upper platen 38 so that negative holders of various thicknesses can be positioned therebetween and, in accordance with my invention, one embodiment only of which is herein disclosed, I have provided means for maintaining an even pressure over the entire area of any flat object placed between said upper platen 38 and the lower platen 125. In operation, said lower hinged platen 125 is swung downward by releasing the latching member 154 therefrom, as most clearly indicated in Fig. 2, thus permitting the positioning of the negative carrier between said platens 38 and 125. After such negative carrier is in position, the lower platen 125 is swung upward until engaged by the latching member 154, as indicated in Figs. 1, 5, 7, 17 and 18.

As best shown in Fig. 12, the lower platen 125 is provided with what may be termed Z-shaped formations 155, 155 permitting the escape of air from between the negative carrier and the platens, when the bellows 126 is compressed during focusing. The described formations, which may be suitably varied in shape so long as their function is maintained, prevent the leakage or entrance of light into the negative carrier. The front upper face of the lower platen 125 is provided with two grooves 156 for a purpose to be subsequently stated.

It will be evident that any conventional negative carrier may be mounted in the enlarger or printer, as I have provided means adapted to various thicknesses of negative carrier, so that no adjustment of parts is required when one negative carrier is replaced by another of thickness differing therefrom. The negative carrier also has numerous advantages over others heretofore furnished with enlargers or printers so far as I am aware, and the structure of such negative carrier is disclosed in Figs. 14 to 19.

The negative carrier is indicated generally at 157, and more particularly in the plan views Figs. 14 and 19. It is composed of an upper plate 158 and a lower plate 159. The former is provided with opposite downturned ears 160, 160, well shown in Fig. 19, and the lower plate 159 is provided with a spring 161 held to said lower plate 159 by bolts 162, 162, said spring 161 being provided with two opposite upturned ears 163, 163. Passing through each pair of ears 160, 163 is a rivet 164, the two rivets providing means pivotally connecting the upper plate 158 and the lower plate 159, as indicated in the several views referred to.

Attached to the upper negative plate 158, as shown in Fig. 19, is a bell crank 165 secured thereto by rivet 166. To the inner end of said bell crank 165 is attached a cone shaped lug 167 having a tip or apex 168 riding in a groove 169 that limits the movement of the bell crank 165. To the lower negative carrier plate 159 is attached a similar cone shaped lug 170. The purpose of the lugs 167 and 170 is to cause the said negative carrier plates 158, 159 to be separated when said bell crank 165 is swung in a contraclockwise direction, as will be evident from a comparison of Figs. 17 and 18, in the former of which figures the said cone shaped lugs are shown as out of vertical alignment and with their lateral faces touching, whereas in Fig. 18 the said conical shaped lugs are shown as in vertical alignment, and therefore touching only at their tips or apices.

In the said upper negative carrier plate 158 are provided two holes 171, 171, and in the lower negative carrier plate 159 there are provided dowels or guide pins 172, 172, which properly guide the film strip through the negative carrier, such strip being indicated in dotted lines 173 in Fig. 19. When said upper plate 158 is closed down, as indicated in Fig. 17, the dowels 172, 172 pass through the holes 171, 171, and they are of such length that when the negative carrier is open somewhat, as indicated in Fig. 18, said dowels 172, 172 still serve as guides for the film strip 173. The upper negative carrier plate 158 is provided with a glass plate 174, and the lower carrier plate 159 is provided with a glass plate 175, as shown in the several figures. The said glass plates are held to the negative carrier plates 158, 159 by a hinge structure, here shown as consisting of a fixed member 176, shown in Figs. 14 and 16, which is riveted to the negative plates by rivets 177, 177, and a movable hinge member 178, shown in Fig. 14. Said members 176 and 178 are provided with the usual hinged pin about which are provided coiled springs 179, 179, causing said hinge member 178 to turn in a clockwise direction, thus exerting downward pressure on the glass plates 174 and 175. At the opposite end of the glass plate 174 and as shown in plan in Fig. 14, there is provided a hold-down strip 180 made of a general Z-shape, as indicated in section in Fig. 16, and held to the upper negative carrier plate 158 by rivets 181, 181.

Viewing Fig. 16, it will be noted that on the lower negative carrier plate 159 the hinge member 178 is positioned on the left hand side, and on the upper negative carrier 168 the hinge member 178 is on the right hand side. This construction equalizes the pressure on the two glass plates 174, 175, thereby maintaining perfect contact thereof with the film strip at all times. The disclosed structure permits the very ready removal of the said glass plates 174, 175 from the negative carrier plates respectively by merely turning said hinge members so as to clear the said glass plates. The said negative carrier as an entirety can then be used as a so-called glassless negative carrier. The described structure also permits the ready cleaning of the parts and the replacing of a glass plate that has been scratched or otherwise damaged.

Attached to the lower negative carrier plate 159, as shown in plan in Fig. 19 and in section in Figs. 17 and 18, there is provided a flat spring member 182 held to said plate by screws 183, 183. The said spring member 182 has dowels 184, 184 at its ends for engaging holes 185, 185 in the lower negative carrier 125, indicated in Figs. 9 and 12. The said dowels 184, 184 pass through clearance holes in the lower negative carrier plate 159, as shown in Figs. 17 and 18. The slots 156, 156, previously referred to, as shown in Fig. 12, in the lower platen 125, serve as locating or guiding means to guide the dowels 184, 184 to engage the holes 185, 185. The said dowels are spring mounted, as it is sometimes desired to place a negative carrier between the upper and lower platen in other than its normal position, as, for example, by swinging or shifting the negative carrier to the right or left for correcting the vertical or horizontal positions of the picture.

It is sometimes desirable to provide auxiliary guides for holding the film strip when long film strips are fed through the enlarger or printer. To provide for such guiding means, and at the same time making them readily detachable, I have, as shown in Figs. 16 and 19, provided a series of projecting shoulder rivets 186, 186, the relative positioning whereof is indicated in Fig. 19. The tray or receptacle that is to be attached is provided with so-called buttonholes so that the enlarged heads of the rivets 186 can be placed through the larger diameter portions of the buttonholes and the tray or receptacle then is moved in a direction to engage the enlarged heads of the said rivets 186, 186.

To facilitate the ready use of the enlarger or printer, the electrical conductor 87, shown in Fig. 1, is threaded through a hole 187 of the tripod head 25 and through a hole in the tripod brace or tube 24. The cable 46 is then brought out through a bushing 188 of the subsidiary base casting 21.

In order to provide means for positioning the projector head at an angle with respect to the vertical centre of the projection printer or enlarger, and so as to be enabled again to duplicate such position when desired, I have provided, as shown in Figs. 2 and 3, a scale 189 on the boss 34 and an index mark 190 on the boss 32. This permits me readily to duplicate any position of the projector head when making projection prints that require the projector head to be used in any position other than vertical.

It will be evident from the foregoing description that the enlarger or projection printer is easy to manipulate and that the numerous adjustments give the operator an opportunity for great flexibility in use. The illumination system and the lamp house provide for sufficient air circulation and the radiation of the heat carries away from the light source the greater part of the heat generated, thus allowing the operator to retain the negative in the projection printer for a great length of time without injuring the negative. The negative carrier is accurately held in position and yet it can be turned or adjusted in a rotary direction about the axis of the projection lens. I have also provided a construction readily permitting the use of lenses of different focal length with means for readily permitting the interchange of different condensing lenses so as to correlate with the selected focal length of projection lens. The disclosed construction also permits the ready removal of the condensing lenses for cleaning.

Heretofore, when using very short focal length lenses on projection printers, the bellows front-frame guide-rod usually projects into the light cone. In the construction herein disclosed, the guide rod can be shifted or adjusted vertically, and only that length thereof that is required for the focal length lens used, is permitted to project below the lamp house bracket or supporting means. It is often desirable to project the image onto the floor when greater distance is required between the projected image and the projection lens than is provided for under normal conditions. This contingency is provided for in the disclosed construction, as the entire tripod structure may be swung through an arc of 180 degrees, thus clearing the entire enlarging base 20 and allowing prints to be made on the floor.

I have also by the described construction provided satisfactory means for making projection prints from single negatives or from a strip film or from usual photographic plates. The negative holder with the spring hinge structure connecting the upper and lower platens allows a great variation in the thickness of the negative material. The negative carrier can be used either with the glass plates, or with the glass plates removed when the glass-free type of negative carrier is preferred. Moreover, means is provided for relieving the pressure on the negative when it is desired to move the negative with respect to the negative carriers, as when feeding strip film. Nevertheless, the entire structure is one of great strength and rigidity, yet is one that can be manufactured at a low cost.

The term "light-modifying means" is herein employed comprehensively to indicate any suitable means for modifying the action of the electric lamp bulb 65. It includes, in the disclosed embodiment of the invention, the condensers or lenses 80, 82, which are also specified in certain of the claims. Other light-modifying means might be employed, such as a ground-glass screen.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic enlarger or projection printer having in combination; an electric light source, a lamp house therefor having a top wall provided with an opening for receiving, and the wall whereof holds in position, said electric light source, light-modifying means mounted at one end portion of said lamp house, supporting means for said lamp house to hold the same with relation to the print, a negative holder and means to maintain it in operative relation to the light-modifying means, said light source including a lamp bulb 65 having a supporting rod 61 extending upward through said opening in the top wall of the lamp house and terminating closely thereabove, and means engaging said rod 61 exteriorly of the lamp house for adjusting the same lengthwise in the lamp house, and electric light wires connected to the light source at a point distinct from said rod 61 and extending out through a side wall of the lamp house with sufficient slack thereof provided within the lamp house to permit vertical adjustment of said rod 61.

2. A photographic enlarger or projection printer having in combination; a light source, a lamp house therefor having a top wall provided with an opening for receiving, and the wall whereof holds in position, said electric light source, light-modifying means mounted at one end portion of said lamp house, supporting means for said lamp house to hold the same with relation to the print, a negative holder and means to maintain it in operative relation to the light-modifying means, said light source including a lamp bulb 65 having a supporting rod 61 extending through said opening in the top of the lamp house and terminating closely thereabove, and there provided with means engaging said rod for effecting a vertical adjustment thereof in the lamp house, said adjusting means including a clamping sleeve 51 directly received in the said opening in the top wall of the lamp house, and through which sleeve said rod 61 passes, and coacting means mounted on said sleeve to compress said sleeve 51 onto said rod or to permit said sleeve to expand and the rod 61 therefore to be manually adjusted longitudinally.

3. A photographic enlarger or projection printer having in combination; an electric light source having electric light wires connected thereto, a lamp house therefor having a top wall with a through-opening and through a side wall of which lamp house said wires extend with sufficient slackness to permit adjustment of said electric light source, light-modifying means mounted at one end portion of said lamp house, supporting means for said lamp house to hold the same with relation to the print, a negative holder and means to maintain it in operative relation to the light-modifying means, a rod 61 extending down through and supported in the said opening in the top wall of the lamp house and supporting the light source, an inverted light-baffle cone 53 surrounding and supported upon the rod 61 close to the top of the lamp house, and having its wall extending outwardly to conduct the heated air against the lateral wall of the lamp house, said cone having an opening for the upward passage of heated air inside said cone, and threaded adjusting means sleeved about said rod 61 above the lamp house for adjusting said light source in the lamp house from a position exteriorly thereof.

4. A photographic enlarger or projection printer having in combination; an electric light source having electric light wires connected thereto, a lamp house therefor having a top wall with a through-opening and through a side wall of which lamp house said wires extend with sufficient slackness to permit adjustment of said electric light source, light-modifying means mounted at one end portion of said lamp house, supporting means for said lamp house to hold the same with relation to the print, a negative holder and means to maintain it in operative relation to the light-modifying means, a rod 61 extending down through and supported in the said opening in the top wall of the lamp house and supporting the light source, an inverted light-baffle cone 53 surrounding and supported upon the rod 61 near the top of the lamp house and having an opening for the upward passage of heated air inside the same, the wall of said cone extending outwardly and upwardly to conduct air against the lateral wall of the lamp house, and threaded adjusting means sleeved about said rod 61 above the lamp house for adjusting said light source in the lamp house from a position exteriorly thereof, said lamp house having openings at its lower end and at its upper end above said cone respectively for the entrance and escape of air.

5. A photographic enlarger or projection printer having in combination; a light source, a lamp house therefor, light-modifying means mounted at one end portion of said lamp house, supporting means for said lamp house to hold the same with relation to the print, a negative holder and means to maintain it in operative relation to the light-modifying means, said lamp house consisting of upper and lower tapering sections meeting at their larger ends, and there connected together so as to be readily detachable from each other, and means for so connecting said sections, said means consisting of a latch plate on one of said sections adjacent the edge of said section, and a pin upon the other section adjacent the edge thereof to engage the latch, whereby the upper section can be turned through a short distance to disengage the pin and latch plate from each other, so that the said upper section can be removed from the lower section.

6. A photographic enlarger or projection printer having in combination; a light source, a lamp house therefor, light-condensing means mounted at one end portion of said lamp house, supporting means for said lamp house to hold the same with relation to the print, a negative holder and means to maintain it in operative relation to the light-condensing means; said lamp house consisting of upper and lower tapering sections meeting at their larger ends, and there connected together for ready separation at said meeting ends, said lower section having an open-ended cylindrical part in alignment with the longitudinal axis of said lamp house, said cylindrical part extending up into and also down below said lower tapered section, and a light condenser unit removably received in said cylindrical part, and consisting of a cylindrical shell fitting within said cylindrical part of the lamp house and light condensing means directly carried thereby, said cylindrical shell being supported upon and depending from the rim of the upper open end of said cylindrical part and readily removable with said light condensing means from the lower part of the lamp house upon the separation of the two sections of the lamp house.

7. A photographic enlarger or projection printer having in combination; a light source, a lamp house therefor, light-condensing means mounted at one end portion of said lamp house, supporting means for said lamp house to hold the same with relation to the print, a negative holder and means to maintain it in operative relation to the light-condensing means; said lamp house consisting of upper and lower tapering sections meeting at their larger ends, and there connected together for ready separation at said meeting ends, said lower section having an open-ended cylindrical part in alignment with the longitudinal axis of said lamp house, and a light condenser unit removably received in said cylindrical part, and consisting of a cylindrical shell fitting within said cylindrical part of the lamp house and light condensing means directly carried thereby, said cylindrical shell being readily removable with said light condensing means from the lower part of the lamp house upon the separation of the two sections of the lamp house, said cylindrical part having an upper rim at its open upper end and the said cylindrical shell having an annular flange to rest upon said rim, and readily separable means engaging said rim and flange to hold said shell removably in place in said cylindrical part.

8. A photographic enlarger or projection printer having in combination; a light source, a lamp house therefor, light-modifying means mounted at one end portion of said lamp house, supporting means for said lamp house to hold the same with relation to the print, a negative holder and means to maintain it in operative relation to the light-modifying means, said lamp house consisting of two oppositely tapering upper and lower sections having means for removably connecting them together at their larger meeting ends, said lower section at its lower end having an upwardly extending tubular portion 74 extending up into the body of the lamp house and spaced from the outer wall of the lamp house, there being openings in the outer wall of the lamp house to admit air at its lower end adjacent the base of said tubular portion and openings at the upper end for the exit of heated air, and baffle rings 91, 92 encircling the tubular portion 74 between it and the outer wall of the lamp house, permitting the circuitous upward passage of the air.

9. A photographic enlarger or projection printer having in combination; a light source, a lamp house therefor, light-modifying means mounted at one end portion of said lamp house, supporting means for said lamp house to hold the same with relation to the print, a negative holder and means to maintain it in operative relation to the light-means, said lamp house consisting of two oppositely tapering upper and lower sections having means for removably connecting them together at their larger meeting ends, said lower section at its lower end having an upwardly extending tubular portion 74 extending up into the body of the lamp house and spaced from the outer wall of the lamp house, there being openings in the outer wall of the lamp house to admit air at its lower end adjacent the base of said tubular portion and openings at the upper end for the exit of heated air, and baffle horizontally positioned rings 91, 92 placed in spaced parallel relation between the inner surface of the outer wall of the lamp house and the outer surface of the tubular portion 74 and encircling the latter and positioned to provide a circuitous upward passage of the entering air thereabout and preventing light-leakage.

10. A photographic enlarger or projection printer having, in combination; a light source, a lamp house therefor, light-modifying means mounted at one end portion of said lamp house, supporting means for said lamp house to hold the same with relation to the print, a negative holder and means to maintain it in operative relation to the light-modifying means, said lamp house consisting of two conical sections 48, 73, each having longitudinally extending heat radiating fins 49, 73a respectively, and means including pin-like formations on one of said sections and hook-like means on the other section for interengagement adjacent the meeting ends of said sections, thereby attaching for ready separation the two conical sections with the said fin structures in longitudinal alignment.

11. A photographic enlarger or projection printer having in combination; a light source, a lamp house therefor, light-modifying means mounted in one end portion of said lamp house, upright main supporting means for said lamp house to hold the same with relation to the print, the lower end of said lamp house having a tubular portion and said light-modifying means supported therein, a negative holder and means to maintain it in operative relation to said light-modifying means, said maintaining means including a tubular portion 38b surrounding and spaced from the lower tubular end of the lamp house, a U-shaped platen support member 37 connected to said tubular portion 38b, a support member 33 to which the platen support member 37 and the lower end of the lamp house above its said tubular portion are rigidly connected, said platen support member having a part 94, means for securing said part 94 to the said entire projector head structure for the lamp house with capacity to tilt, means for securing it in selected tilted position, and means for pivotally securing on a horizontal axis said entire projector head structure to the upright main supporting means for adjustment about such horizontal axis, such means including a boss 34 upon said support member 33 and a boss upon said upright main supporting means, and a horizontal pivotal screw 35 extending into said bosses and upon which the entire projected head structure may be tilted in an upright path.

12. A photographic enlarger or projection printer having in combination; a light source, a lamp house therefor, light-modifying means mounted in one end portion of said lamp house, upright main supporting means for said lamp house to hold the same with relation to the print, the lower end of said lamp house having a tubular portion and said light-modifying means supported therein, a negative holder and means to maintain it in operative relation to said light-modifying means, said supporting means for the entire lamp house structure including an arm 31 having a terminal portion 32, an enlarger support member 33 secured to the lamp house, and having a part 34 received at the terminal portion 32, a screw 35 extending into both said parts 32, 34 and constituting a horizontal pivot upon which the entire lamp house structure may be turned with respect to said upright main supporting means, said enlarger support member 33 having means constituting part of said negative holder maintaining means to support for tilting adjusting movement upon a horizontal axis the said negative holder with relation to said light-modifying means, and means for tilting the part 34 and the lamp house structure as an entirety about a horizontal axis at said terminal portion 32.

13. A photographic enlarger or projection printer having in combination; a light source, a lamp house therefor, light-modifying means mounted in one end portion of said lamp house, upright main supporting means for said lamp house to hold the same with relation to the print, the lower end of said lamp house having a tubular portion and said light-modifying means supported therein, a negative holder and means to maintain it in operative relation to said light-modifying means, said supporting means for the entire lamp house structure including an arm 31 having a terminal portion 32, an enlarger support member 33 secured to the lamp house, and having a part 34 received at and turnably secured to the terminal portion 32, a screw 35 extending into both said parts 32, 34 and constituting a horizontal pivot upon which the entire lamp house structure may be turned with respect to said upright main supporting means, said enlarger support member 33 having means constituting part of said negative holder maintaining means to support for tilting adjusting movement upon a horizontal axis the said negative holder with relation to said light-modifying means, and means for permitting tilting of the part 34 and the lamp house structure as an entirety about a horizontal axis, such means including a horizontal threaded member 35 received in said portion 32 and part 34, whereby the lamp house may be swung through an extended arc on a transverse pivot with relation to the main supporting means.

14. A photographic enlarger or projection printer having in combination; a light source, a lamp house therefor, light-modifying means mounted in one end portion of said lamp house, upright main supporting means for said lamp house to hold the same with relation to the print, the lower end of said lamp house having a tubular portion and said light-modifying means supported therein, a negative holder and means to maintain it in operative relation to said light-modifying means, said supporting means for the entire lamp house structure including an arm 31 having a terminal portion 32, an enlarger support member 33 secured to the lamp house, and having a part 34 received at and turnably secured to the terminal portion 32, a screw 35 extending into both said parts 32, 34 and constituting a horizontal pivot upon which the entire lamp house structure may be turned with respect to said upright main supporting means, said enlarger support member 33 having means constituting part of said negative holder maintaining means to support for tilting adjusting movement upon a horizontal axis the said negative holder with relation to said light-modifying means, and means for permitting tilting of the part 34 and the lamp house structure as an entirety about a horizontal axis, consisting of a screw 35 received in the parts 32, 34 and cooperating means at the adjacent faces of the parts 32, 34.

15. A photographic enlarger or projection printer having in combination; a light source, a lamp house therefor, light-modifying means mounted in one end portion of said lamp house, upright main supporting means for said lamp house to hold the same with relation to the print, the lower end of said lamp house having a tubular portion and said light-modifying means supported therein, a negative holder and means to maintain it in operative relation to said light-modifying means, said maintaining means including a tubular portion 38b surrounding and spaced from the lower tubular end of the lamp house, a U-shaped platen support member 37 connected to said tubular portion 38b, a platen pivotally mounted in said platen support and having a boss 106 extending upwardly from such axis of the platen, said platen support having a boss 104 and a screw rod 105 mounted in said boss 104 and engageable with said boss 106 for effecting pivotal adjustment of said platen, said platen support member 37 having a boss 101 at the opposite side of said boss 106 from said screw rod 105, and means carried by said boss 101 to be engaged by said boss 106 in the rocking movement of said platen.

16. A photographic enlarger or projection printer having in combination; a light source, a lamp house therefor, light-modifying means mounted in one end portion of said lamp house, upright main supporting means for said lamp house to hold the same with relation to the print, the lower end of said lamp house having a tubular portion and said light-modifying means supported therein, a negative holder and means to maintain it in operative relation to said light-modifying means, said maintaining means including a tubular portion 38b surrounding and spaced from the lower tubular end of the lamp house, a U-shaped platen support member 37 connected to said tubular portion 38b and having spaced bosses 101 and 104, a platen having an extending lug between said bosses and a screw 105 threaded through the boss 104 and engaging said lug 106, said boss 101 having mounted therein in spring pressed opposition to said screw 105 a spring pressed plunger 102 engaging said lug 106.

17. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, and means for maintaining irrespective of the thickness of the negative carrier and without adjustment for negative carriers of different thickness, an even pressure over the entire area between said platens with respect to a flat object placed therebetween for printing purposes, said last mentioned means including means permitting the escape of air from between the negative carrier and the platens.

18. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, the lower platen having one or more channels to permit the escape of air from between the negative carrier and the platens.

19. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, the lower platen having one or more channels to permit the escape of air from between the negative carrier and the platens, said channel or channels being of irregular shape to prevent the entrance or leakage of light.

20. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, the said upper platen having attached along an edge thereof a spring 143 having pivot-receiving end portions and said lower platen being pivotally mounted upon said end portions.

21. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, the said upper platen having attached along an edge thereof a spring 143 having pivot-receiving end portions and said lower platen being pivotally mounted upon said end portions, said upper platen having bosses 148, 148 at an edge opposite said spring 145 and a latching spring 149 secured to said bosses.

22. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, the said upper platen having attached along an edge thereof a spring 143 having pivot-receiving end portions and said lower platen being pivotally mounted upon said end portions, said upper platen having bosses 148, 148 at an edge opposite said spring 145 and a latching spring 149 secured to said bosses, said spring 149 having a handle 152 to engage a cooperating latching member.

23. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, and a negative carrier receivable between the platen structures and comprising plates 158, 159 pivoted together, and having means to support glass plates therein respectively, and combined platen structures having means to equalize the pressure on said glass plates to maintain perfect contact with the negative therebetween, said last mentioned means including channeled formations at a surface of a platen to permit the escape of air from between the negative carrier and the platens.

24. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, and a negative carrier receivable between the platen structures and comprising plates 158, 159 pivoted together, one of said plates having a bell crank lever 165 attached thereto and having a tapered projection 167, said plate also having a short groove 169 to limit the movement of said bell crank, and the other of said plates having a co-acting tapered projection 170.

25. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, and a negative carrier receivable between the platen structures and comprising plates 158, 159 pivoted together, said plate 158 having opposite ears 160, 160 and said lower plate 159 having a spring 161 held to said lower plate by bolts, said spring having opposite ears 163, 163 and a rivet 164 passing through each pair of ears 160, 163, thereby providing means pivotally connecting said upper plate 158 and said lower plate 159.

26. A photographic enlarger or projection printer having in combination; a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, and a negative carrier receivable between the platen structures and comprising plates 158, 159 pivoted together, each of said plates having readily removable glass plates mounted therein to receive the negative therebetween, and said combined platen structures having means to equalize the pressure on said glass plates so as to maintain perfect contact with the negative therebetween, said last mentioned means including formations 155, 155 shaped to permit the escape of air from between the negative carrier and the platens, and to prevent entrance of light into the negative carrier.

27. A photographic enlarger or projection printer having in combination; a lamp source, a lamp house therefor, light-modifying means mounted at one end portion of said lamp house, supporting means for said lamp house to hold the same with relation to the print, a negative holder and means to maintain it in operative relation to the light-modifying means, said maintaining means including an upper negative platen structure having an extension surrounding but spaced from the light-modifying means and a lower platen structure hingedly connected to said upper platen structure, said supporting means including a tripod having an arm 31 adjustably connected thereto, a supporting part 33 directly and rigidly connected to the lower end platen of the lamp house closely adjacent to said light-modifying means, and connected to said arm 31 by a transverse pivot permitting extended swinging of the lamp house in an upright plane, said part 33 having a boss 34 and said arm 31 having a boss 32, said bosses having parallel faces and a plate 119 between said faces, said transverse pivot being received in said bosses and said plate 119, and means for tilting the upper platen structure with respect to said modifying means upon two different transverse axes spaced at ninety degrees.

28. A combination according to claim 11, but in which the boss 34 has projecting from its face a dowel pin 121, and in which combination the boss 32 has a segmental groove 120 for said dowel pin, the said pivotal screw being threaded into said bosses.

29. A combination according to claim 11, but in which the boss 34 has detent means engageable with a formation in the face of the boss 32 to align the projector head in vertical position.

30. A photographic enlarger or projector printer having in combination a light source, a lamp house therefor, light-modifying means mounted in one end portion of said lamp house, the lower end of said lamp house having light condensing means supported therein, a negative holder and means to maintain it in operative relation to said light-modifying means, a substantially U-shaped platen support member 37 carrying said negative holder, a projector support 33 rigidly connected with the lower end of the lamp house adjacent to said light-modifying means, said member 33 having an upright face upon which said support member 37 is mounted for turning movement about a horizontal pivot, said parts together constituting the entire projector head, upright main supporting means for said lamp house to hold the same with relation to the print, and a horizontally positioned pivotal member for securing said entire projector head structure to the said upright main supporting means for the lamp house with capacity to tilt about said pivot.

31. A combination according to claim 30, but in which the member 33 is provided with a boss or pad 34 and the upright main supporting means is provided with a companion boss or pad 32, and the pivotal member is received in threaded relation to said pads.

32. A combination according to claim 30, but in which the upright, main, supporting means is provided with a pad or boss 32 having a segmental groove 120, and the entire projector head structure is provided with a companion boss or pad 34 having a dowel pin 121 to engage said groove, the pivot member being received in a threaded relation in said pads.

33. A combination according to claim 30, but in which the upright, main, supporting means is provided with a pad or boss 32, and the entire projector head structure is provided with a companion boss 34 having a spring pressed detent at its face to engage a face formation in the pad 32 for aligning the parts vertically, the said pivotal member having a threaded relation in the said pads.

34. A photographic enlarger or projection printer having in combination, a light source, a lamp house therefor, light-modifying means mounted at one end portion of said lamp house, supporting means for said lamp house to hold the same with relation to the print, a negative holder, and means to maintain it in operative relation to the light-modifying means, said maintaining means including an upper platen structure and a lower platen structure pivoted thereto to receive the negative carrier therebetween, one of said platens having one or more channels to permit the escape of air from between the negative carrier and the platens.

JOHN P. THOMSON.